United States Patent [19]

Lin et al.

[11] Patent Number: 5,178,585
[45] Date of Patent: Jan. 12, 1993

[54] CHAIN WITH EASILY ADJUSTABLE NUMBER OF LINKS

[75] Inventors: Hsien S. Lin, Tainan; Hung M. Ko; Ming T. Lin, both of Tainan Hsien, all of Taiwan

[73] Assignee: Ta Ya Chain Co., Ltd., Tainan Hsien, Taiwan

[21] Appl. No.: 816,429

[22] Filed: Dec. 31, 1991

[51] Int. Cl.$^5$ .............................................. F16G 13/00
[52] U.S. Cl. .................................... 474/206; 474/212
[58] Field of Search ........................ 474/206, 210–217

[56] References Cited

U.S. PATENT DOCUMENTS 1,027,002  5/1912  Richmond .......................... 474/216
2,517,497  8/1950  Lauenstein ...................... 474/206 X
2,525,561  10/1950 Pierce ................................ 474/213
2,669,879  2/1954  Pierce ................................ 474/217

Primary Examiner—Thuy M. Bui
Attorney, Agent, or Firm—Hedman, Gibson & Costigan

[57] ABSTRACT

A chain with an easily adjustable number of links for bicycles. The chain has links each having a first outer chain plate, a second outer chain plate, a first inner chain plate, a second inner chain plate, and a pin. The first outer chain plate has two holes each defined by overlapping circles of different diameters, forming a figure-eight outline. The pin has a flat button at an end thereof, a neck at the other end thereof, and a dome button formed on the neck.

1 Claim, 4 Drawing Sheets

CHAIN WITH EASILY ADJUSTABLE NUMBER OF LINKS

BACKGROUND OF THE INVENTION

The present invention relates to a chain for use in a bicycle and, more particularly, to a chain with an easily adjustable number of links.

In the past few years, there have been a number of commercially successful models of bicycles besides the conventional ones. For example, BMX bicycles, mountain bicycles, touring bicycles, competitive bicycles, etc. are well-known and popular. Generally, different types of bicycles employ chains with different numbers of links, e.g., 100, 102, 104, etc., up to 118 links, and the links are equal in size. Chains of different sizes refers to chains with different numbers of identical links. Chains are manufactured and sold conventionally with standardized sizes, i.e., with standardized numbers of links, each being used on a specific type of bicycle.

This way of manufacturing and selling of chains is round not optimum. As buyers might want chains of non-standardized sizes or chains of standardized sizes which are not readily available, a retailer may have to take off a few links from a currently available chain to satisfy buyers' needs. For example, a buyer might want a chain with 112 links while a retailer only provides chains with 114 links. Apparently, the retailer has to take two links out of the chain with 114 links with tools and which takes time, otherwise, the chain will not match the buyer's bicycle. This might damage the chain so as to reduce the strength of the chain. Therefore, the present invention is intended to provide a chain with an easily adjustable number of links.

SUMMARY OF THE INVENTION

It is an object of the present invention to provide a chain with an easily adjustable number of links.

It is another object of the present invention to provide a chain with links each having a first outer chain plate, a second outer chain plate, a first inner chain plate, a second inner chain plate, and a pin. The first outer chain plate has two holes each defined by overlapping circles of different diameters, forming a figure-eight outline. The pin has a flat button at an end thereof, a neck at the other end thereof, and a dome button formed on the neck.

Additional objects, if not specifically set forth herein, will be readily apparent to those skilled in the art from the detailed description of embodiments below, with reference of the accompanying drawings.

Figure 1:
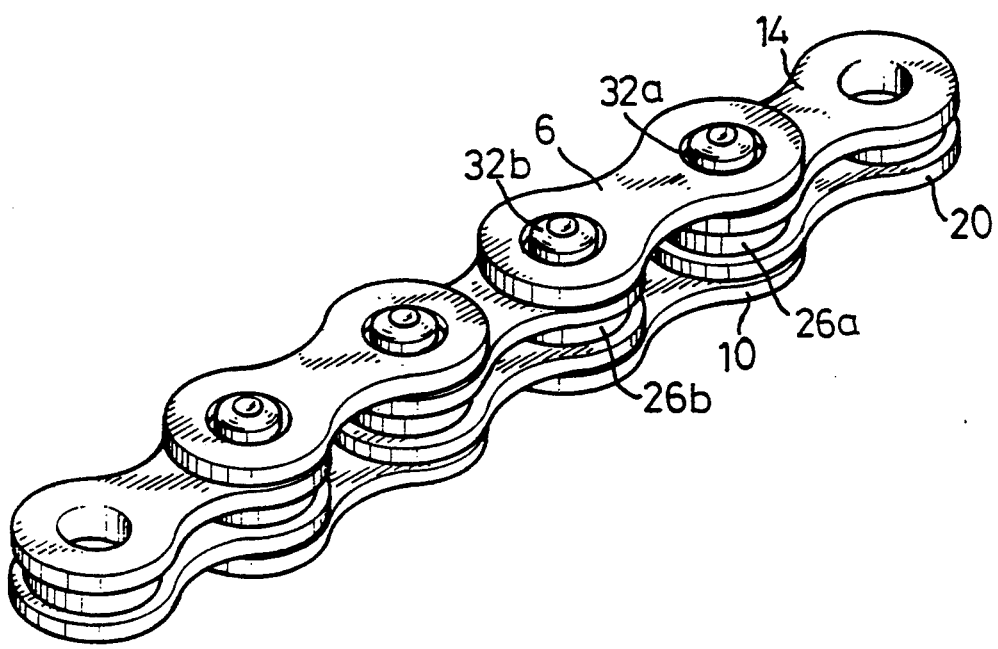
FIG. 1 is a perspective view of a chain with an easily adjustable number of links in accordance with the present invention.

The preferred embodiment as shown in the drawings are used for illustration, not for limitation, of the present invention.

DETAILED DESCRIPTION OF THE PREFERRED EMBODIMENT

This invention is to be understood by description of the preferred embodiment with reference to the drawings.

Referring to the drawings and, more specifically, to FIG. 1, a chain 2 has a plurality of links 4 as shown in a segment thereof.

Figure 2:
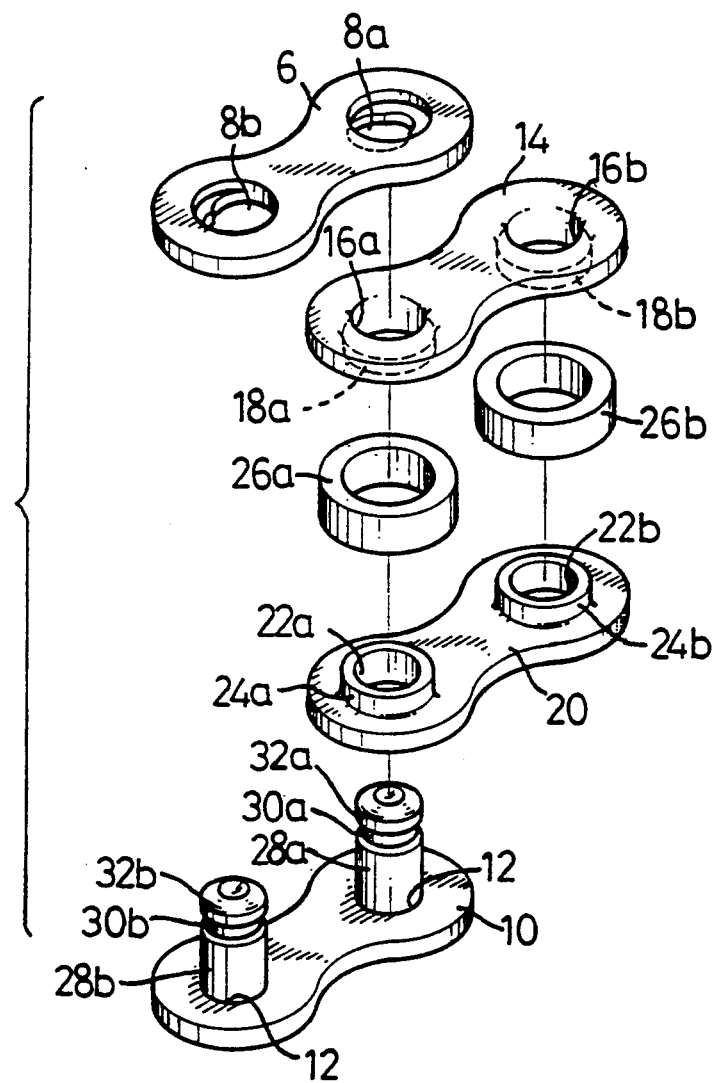
FIG. 2 is an exploded view of a link in accordance with the present invention.
Figure 3:
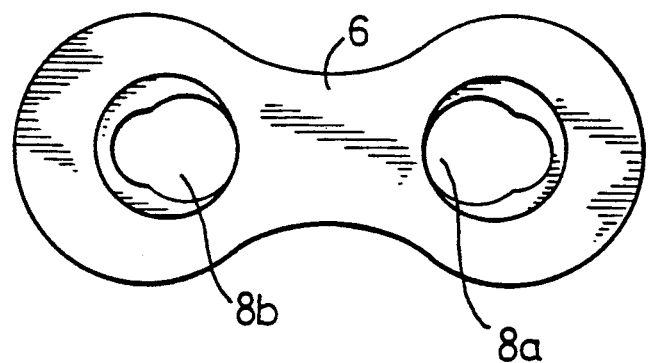
FIG. 3 is a plane view of an outer chain plate in accordance with the present invention.

Referring to FIGS. 2 and 3, the link 4 has a first outer chain plate 6, a second outer chain plate 10, a first inner chain plate 14, a second inner chain plate 20, a pair of rollers 26a and 26b, and a pair of pins 28a and 28b.

The first outer chain plate 6 has a first circular cavity at one end thereof and a second circular cavity at the other end thereof. At the bottom of the first cavity a hole 8a is formed. The hole 8a is defined by overlapping a first semi-circular hole 8a' and a second semi-circular hole 8a'' diametrically greater than the first semi-circular hole 8a', thereby forming a figure-eight outline. Similarly, a hole 8b is formed at the bottom of the second cavity. The hole 8b is defined by overlapping a first semi-circular hole 8b' and a second semi-circular hole 8b'', thereby forming a figure-eight outline. Centers of the semi-circular holes 8a', 8a'', 8b', and 8b' are aligned to each other, while the centers of the semi-circular holes 8a, and 8b' are distal to each other.

The second outer chain plate 10 has a hole 12a at an end thereof and a hole 12b at the other end thereof. The first inner chain plate 14 has a hole 16a and a tubular flange 18a at an end thereof and a hole 16b and tubular flange 18b at the other end thereof. The second inner chain plate 20 has a hole 22a and tubular flange 24a at an end thereof and a hole 22b and tubular flange 24b at the other end thereof. The second chain plate 10, the inner chain plates 14 and 20, and the pair of rollers 26a and 26b are conventional and need no further description.

The pin 28a has a flat button 34a at an end thereof, a neck 30a at the other end thereof, and a dome button 32a formed on the neck 30a. The neck 30a has a diameter less than that of the first semi-circular hole 8a', so that the neck 30a can be received in the first semi-circular holes 8a'. The dome button 32a has a diameter slightly less than that of the second semi-circular hole 8a'', so that the dome button 32 can be inserted through the second semi-circular hole 8a''. The pin 28b has a flat button 34b at an end thereof, a neck 30b at the other end thereof, and a dome button 32b formed on the neck 30b. The neck 30b has a diameter less than that of the first semi-circular hole 8b', so that the neck 30b can be received in the first semi-circular holes 8b'. The dome button 32b has a diameter less than that of the second semi-circular hole 8b'', so that the dome button 32 can be inserted through the second semi-circular hole 8b''.

Figure 4:
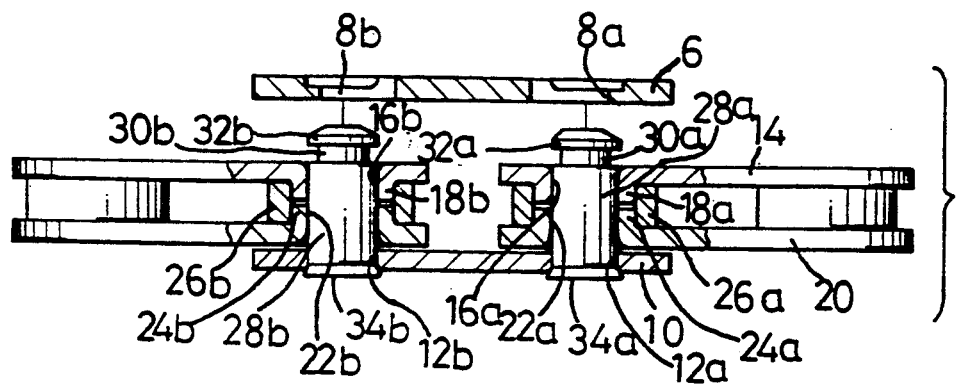
FIG. 4 is a cross-sectional view of links before joined in accordance with the present invention.
Figure 5:
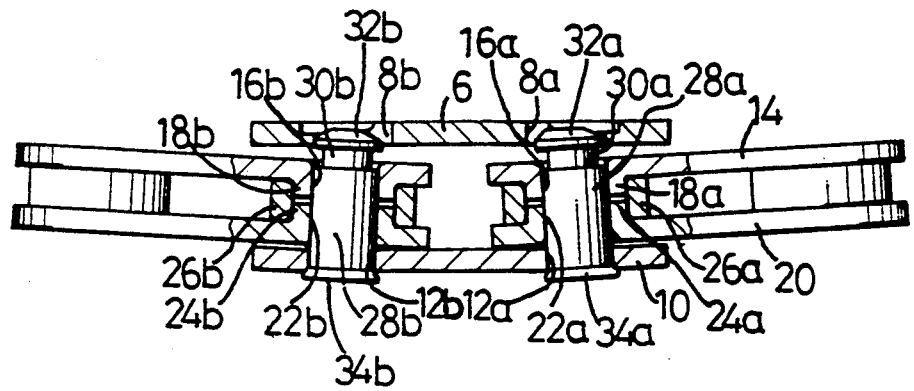
FIG. 5 is a cross-sectional view of links being joined in accordance with the present invention.
Figure 6:
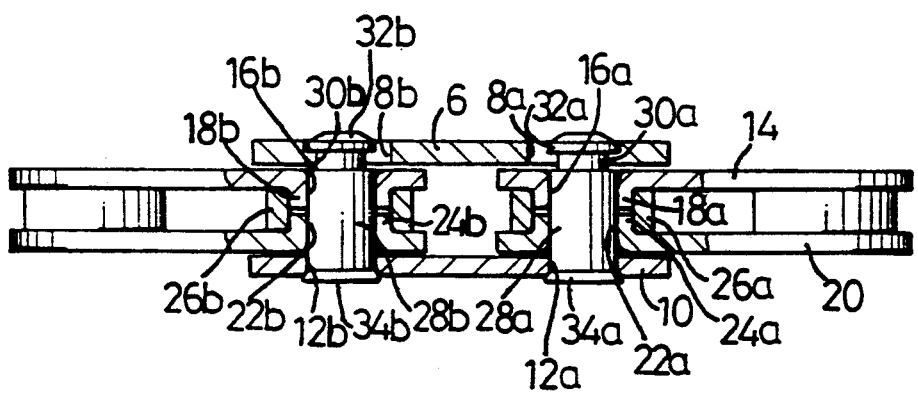
FIG. 6 is a cross-sectional view of links after joined in accordance with the present invention.

To understand how to assemble the links 4 in order to form a chain 2, FIGS. 4, 5, and 6 are used to illustrate the process of assembling the links 4 into the chain 2. Referring to FIG. 4, the tubes 18a and 24a of a first pair of inner chain plates 14 and 20 are received in the roller 26a. The first pair of inner chain plates 14 and 20 are disposed between the outer chain plates 6 and 10. The pin 28a is inserted through the holes 12a, 22a, and 16a. The tubes 18b and 24b of a second pair of inner chain plates 14 and 20 are received in the roller 26b. The second pair of inner chain plates 14 and 20 are disposed between the outer chain plates 6 and 10. The pin 28b is inserted through the holes 12b, 22b, and 16b.

Referring to FIG. 5, the segment of chain 2 is bent, thereby urging the dome buttons 32a and 32b toward each other, so that the dome buttons 32a and 32b are respectively inserted through the semi-circular holes 8a'' and 8b''.

Referring to FIG. 6, the segment of the chain 2 is released. The necks 30a and 30b are respectively received in the semi-circular holes 8a' and 8b'. When in operation, the pairs of inner chain plates 14 and 20 are pulled, so that the dome buttons 32a and 32b are not allowed to lean toward each other, thereby preventing the dome buttons 32a and 32b from escaping from the semi-circular holes 8a'' and 8b''.

When wishing to disassemble the chain 2, the above-mentioned steps shown in FIGS. 4, 5, and 6 are reversed.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

We claim:

1. A chain link comprising a first outer chain plate with a first hole and a second hole; a second outer chain plate with a first hole and a second hole; a first inner chain plates with a first hole and a second hole; a second inner chain plates with a first hole and a second hole; a tubular roller residing between said inner chain plates; a pin being insertable through said first hole of said second outer chain plate, said first hole of said second inner chain plate, said tubular roller, said first hole of said first inner chain plate, and said first hole of said first chain plate; the improvements comprising:

said holes of said first outer chain plate each being formed by overlapping a first semi-circular hole and a second semi-circular hole diametrically greater than said first semi-circular hole, thereby defining a figure-eight outline, said second semi-circular holes being proximal to each other; and said pin having a flat end diametrically greater than the hole of the second outer chain plate, a dome end being insertable through said second semi-circular hole, and a neck being fitable in said first semi-circular hole.

* * * * *